Patented Feb. 9, 1926.

1,572,573

UNITED STATES PATENT OFFICE.

FRITZ STRAUB, OF BASEL, AND HERMANN SCHNEIDER, OF RIEHEN, NEAR BASEL, SWITZERLAND, ASSIGNORS TO THE FIRM SOCIETE OF CHEMICAL INDUSTRY IN BASLE, OF BASEL, SWITZERLAND.

AZODYESTUFFS CONTAINING ZINC AND PROCESS OF MAKING SAME.

No Drawing. Application filed October 1, 1925. Serial No. 59,960.

*To all whom it may concern:*

Be it known that we, FRITZ STRAUB, residing at Basel, Switzerland, and HERMANN SCHNEIDER, residing at Riehen, near Basel, Switzerland, both citizens of the Swiss Confederation, have invented new and useful Azodyestuffs Containing Zinc and Processes of Making Same, of which the following is a full, clear, and exact specification.

The present invention relates to new dyestuffs containing zinc. It comprises the new dyestuffs, the process of making same, and the material dyed with the new dyestuffs.

It has been found that valuable new azodyestuffs containing zinc may be obtained by treating the dyestuffs obtained by coupling the nitrated diazocompound of 1-amino-2-hydroxynaphthalene-4-sulfonic acid with a naphthol and reduction of the nitro group, with agents yielding zinc, such as zinc hydroxide and its compounds with alkalies and ammonia.

The new dyestuffs, of which the exact constitution is not known, are the zinc derivatives of the azodyestuffs corresponding with the general formula

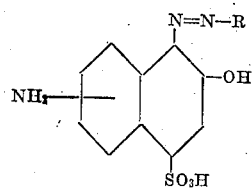

wherein R stands for a hydroxynaphthalene nucleus to which the azobridge is attached in ortho-position to the hydroxyl group. They form dark powders, dissolving readily in water with violet coloration which changes to bluish-red by addition of caustic alkalies, dyeing wool violet to brownish-black tints which become gray to black by afterchroming.

The following examples illustrate the invention, the parts being by weight:

Example 1.

43,2 parts of the dyestuffs obtained by coupling the nitrated diazocompound of 1-amino-2-hydroxynaphthalene-4-sulfonic acid and α-naphthol and reduction of the nitro group, are dissolved in 600 parts of water and treated at ordinary temperature with an alkaline solution of zinc, obtained by dissolving 7 parts of zinc chloride in a caustic potash solution containing 56 parts of caustic potash to 50 parts of water. The whole is stirred for some time, the excess of alkali neutralized and the zinc derivative of the dyestuff salted out. The new dyestuff containing zinc, which is a derivative of the dyestuff corresponding with the formula:

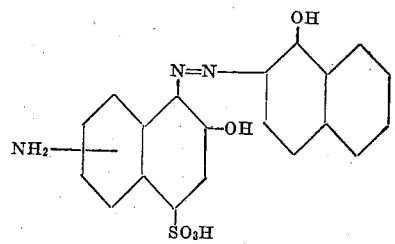

forms a blackish-brown powder, dissolving in water with violet coloration which changes to bluish-red by addition of caustic alkalies, dyeing wool violet to brownish-black tints which become gray to black by afterchroming.

Example 2.

500 parts of a solution of sodium hydroxide of 10% strength are treated with 7 parts of a concentrated solution of zinc chloride. The whole is stirred until all is well dissolved and 43 parts of the dyestuff obtained by coupling the nitrated diazocompound of 1-amino-2-hydroxynaphthalene-4-sulfonic acid and β-naphthol and reduction of the nitro group, dissolved in 750 parts of water, are then added. The mixture is stirred for some time, neutralized with mineral acid and the zinc compound salted out. The dyestuff containing zinc, which is a derivative of the dyestuff corresponding with the formula:

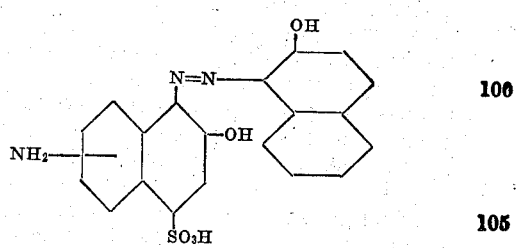

shows the same properties as the dyestuff of the first example.

Instead of the agents yielding zinc indicated in the examples, other compounds, as for instance the reaction product of ammonia and zinc chloride, zinc hydroxide, and the like, may be employed.

What we claim is:

1. The herein described process for the production of new azodyestuffs containing zinc, by treating the dyestuffs obtained by coupling the nitrated diazocompound of 1-amino-2-hydroxynaphthalene-4-sulfonic acid and naphthols, and reduction of the nitro group, with agents yielding zinc.

2. As new products the herein described new azodyestuffs containing zinc, which are derivatives of the dyestuffs corresponding with the general formula:

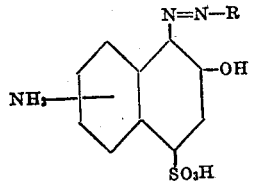

wherein R stands for a hydroxynaphthalene nucleus to which the azobridge is attached in ortho-position to the hydroxyl group, which products form dark powders dissolving readily in water with violet coloration which changes to bluish-red by addition of caustic alkalies, dyeing wool violet to brownish-black tints which become gray to black by afterchroming.

3. Material dyed with the dyestuffs of claim 2.

In witness whereof we have hereunto signed our names this 21st day of September 1925.

FRITZ STRAUB.
HERMANN SCHNEIDER.